(12) United States Patent
Beckman et al.

(10) Patent No.: US 11,260,977 B2
(45) Date of Patent: Mar. 1, 2022

(54) FILTRATION APPARATUS FOR USE WITH AIRCRAFT

(71) Applicant: The Boeing Company, Chicago, IL (US)

(72) Inventors: Mary E. Beckman, West Chester, PA (US); Andrew Leung, Philadelphia, PA (US)

(73) Assignee: The Boeing Company, Chicago, IL (US)

(*) Notice: Subject to any disclaimer, the term of this patent is extended or adjusted under 35 U.S.C. 154(b) by 379 days.

(21) Appl. No.: 16/209,488

(22) Filed: Dec. 4, 2018

(65) Prior Publication Data

US 2020/0172251 A1 Jun. 4, 2020

(51) Int. Cl.
| | |
|---|---|
| *B64D 13/06* | (2006.01) |
| *B01D 46/00* | (2006.01) |
| *F24F 8/90* | (2021.01) |
| *F24F 13/28* | (2006.01) |
| *B01D 46/10* | (2006.01) |
| *B01D 46/52* | (2006.01) |

(52) U.S. Cl.
CPC ......... *B64D 13/06* (2013.01); *B01D 46/0071* (2013.01); *B01D 46/10* (2013.01); *B01D 46/521* (2013.01); *B64D 2013/0651* (2013.01); *F24F 8/90* (2021.01); *F24F 13/28* (2013.01)

(58) Field of Classification Search
CPC ............ B64D 13/06; B64D 2013/0651; B01D 46/0071; B01D 46/10; B01D 46/521; B01D 46/0068; F24F 8/90; F24F 13/28
See application file for complete search history.

(56) References Cited

U.S. PATENT DOCUMENTS

| | | | | |
|---|---|---|---|---|
| 4,738,696 A | * | 4/1988 | Staffeld | B01D 46/0001 55/302 |
| 5,405,421 A | * | 4/1995 | Swisher, Jr. | B01D 46/002 55/284 |
| 2011/0011042 A1 | * | 1/2011 | Gillingham | B01D 46/0068 55/302 |
| 2015/0292408 A1 | | 10/2015 | Suciu et al. | |
| 2016/0082380 A1 | * | 3/2016 | Seitz | B01D 46/2411 95/280 |

(Continued)

OTHER PUBLICATIONS

United States Patent and Trademark Office, "Non-Final Office Action," issued in connection with U.S. Appl. No. 16/209,526, dated Jul. 2, 2020, 20 pages.

(Continued)

*Primary Examiner* — Robert Clemente
*Assistant Examiner* — Hafiz Muhammad Aamir
(74) *Attorney, Agent, or Firm* — Hanley, Flight & Zimmerman, LLC (57) ABSTRACT

Filtration apparatus are disclosed. An example filtration apparatus includes a housing including a plurality of walls defining a cavity, a filter located in the cavity, and a cleanout system coupled to the housing. The cleanout system includes a cleanout passageway between an outer surface of the housing and the filter. The cleanout system includes a cleanout inlet accessible from the outer surface of the housing and a cleanout outlet in fluid communication with the filter. The cleanout system enables removal of particulate from the filter without removing the filter from the housing.

22 Claims, 7 Drawing Sheets

(56) References Cited

U.S. PATENT DOCUMENTS

2017/0292412 A1 10/2017 Fonseca
2020/0172252 A1 6/2020 Beckman et al.

OTHER PUBLICATIONS

United States Patent and Trademark Office, "Final Office Action," issued in connection with U.S. Appl. No. 16/209,526, dated Dec. 1, 2020, 19 pages.

* cited by examiner

FILTRATION APPARATUS FOR USE WITH AIRCRAFT

FIELD OF THE DISCLOSURE

This disclosure relates generally to filtration apparatus and, more particularly, to filtration apparatus for use with aircraft.

BACKGROUND

Filtration apparatus (e.g., air filters) are commonly used to provide clean air for people and/or to system(s). For example, filtration systems are commonly used to filter or remove particulate matter in in building ventilation systems, vehicles (e.g., aircraft, industrial equipment, etc.), industrial process(es), etc.

Certain examples are shown in the above-identified figures and described in detail below. In describing these examples, like or identical reference numbers are used to identify the same or similar elements. The figures are not necessarily to scale and certain features and certain views of the figures can be shown exaggerated in scale or in schematic for clarity and/or conciseness. As used in this patent, stating that any part is in any way positioned on (e.g., located on, disposed on, formed on, coupled to, etc.) another part, means that the referenced part is either in contact with the other part, or that the referenced part is spaced from the other part with one or more intermediate part(s) located therebetween. Stating that any part is in contact with another part means that there is no intermediate part between the two parts. Additionally, several examples have been described throughout this specification. Any features from any example can be included with, a replacement for, or otherwise combined with other features from other examples.

DETAILED DESCRIPTION

Filtration systems commonly operate in harsh conditions (e.g., sandy, dusty or dirty environments). To provide filtered air to downstream components (e.g., an engine air intake system or other equipment) in harsh conditions, some fil-

2 tration systems employ filters that include a particle separator and a filter barrier to remove particulate (e.g., dust or dirt) from airflow. As the filter collects airborne particulate or debris, the filter becomes clogged (i.e., with particulate or debris) causing airflow restriction through the filter and, thus, airflow reduction to the downstream system or components. In some instances, such restriction or reduction of airflow can affect the performance of the downstream components. To prevent or minimize the effects on downstream components, filters of filtration systems can require frequent maintenance. For example, some aircraft employing filtration devices are cleaned or replaced after each mission, especially aircraft employed in harsh conditions (e.g., sandy areas).

To remove particulate from conventional filters (e.g., to clean clogged filters), the filters are often removed from a platform or system (i.e., prior to cleaning by maintenance personnel). Removing the filter from the filtration system can be time consuming and/or increases maintenance costs. To reduce frequent cleaning or replacement of filters, some conventional filtration systems include filters that are sized to provide filtration capability for extended periods of operation between maintenance cycles. Thus, some filtration systems have relatively large sized filters to provide sufficient filtration capability between maintenance cycles.

In some examples, compressed air available from a platform is used to periodically back-flush a filter to clean trapped particulate (e.g., dust and dirt particles, etc.) from the filter. However, some back-flush systems have added valves (e.g., shut-off valves) to change and/or control a direction of the back-wash fluid, which can greatly increase complexity of a filtration system and reduce overall reliability. Depending upon the platform, conventional back-flush systems can impose a significant power and/or weight penalty when implemented with aircraft. In some instances, conventional back-flush systems can cause downstream debris to be sucked back into the system and potentially affect the performance downstream components.

Example filtration apparatus disclosed herein reduce and simplify filter maintenance for platforms or fluid (e.g., air) intake systems. Example filtration apparatus disclosed herein facilitate filter cleaning without the need to remove the filter from a platform or a filtration apparatus (e.g., a housing). Example filtration apparatus disclosed herein allow a filter to be cleaned and maintained more efficiently while remaining attached to a platform (e.g., an aircraft) during a cleaning process. Integration of example filtration apparatus disclosed herein onto system platforms improve system reliability and readiness, reduce system complexity and allow use of smaller, lighter filters. Additionally, example filtration apparatus disclosed herein enable elimination of a particle separator, thereby reducing the size and/or weight of a filtration apparatus compared to a conventional filtration apparatus.

Example filtration apparatus disclosed herein can be used to protect system components and/or to provide clean air for people or processes. In general, example filtration apparatus disclosed herein can be used with any system or platform that uses or draws fluid (e.g., atmospheric air). In some examples, filtration apparatus disclosed herein can be used with platforms that operate in harsh environmental conditions (e.g., sandy, dusty or dirty environments). In some examples, filtration apparatus disclosed herein can be employed with aircraft, vehicle(s), heating, ventilation and air conditioning (HVAC) systems, construction equipment and/or vehicle(s), and/or any other vehicle, ventilation system and/or systems requiring filtered airflow. For example, filtration apparatus disclosed herein can provide filtered air to a compressor downstream of the filtration apparatus. In some examples, filtration apparatus disclosed herein provide filtered airflow to construction vehicle(s) and/or construction equipment. In some examples, filtration apparatus disclosed herein provide filtered airflow to an air intake of an automobile engine, an automobile passenger cabin, an aircraft passenger cabin, an aircraft engine intake, etc. In some examples, filtration devices disclosed herein can be used to filter airflow for a compressor. In some examples, filtration devices disclosed herein can be employed to remove dust and sand from engine-bound air to prolong engine operating life.

To clean a filter while coupled to the filtration apparatus, example filtration devices disclosed herein incorporate a cleaning system. In some examples, the cleaning system in a filter housing or filtration apparatus efficiently directs a cleaning fluid (e.g., compressed air, pressurized water, etc.) onto a back face (e.g., a downstream side) of the filter to remove dust and dirt particles trapped on a front face (e.g., an upstream side) of the filter. The cleaning system of the illustrated example enables application of a cleaning fluid to clean the filter while the filter is installed on a platform (e.g., a vehicle, an aircraft, etc.). Example cleaning systems disclosed herein include tubing or ducting to efficiently channel or route cleaning fluid to a filter surface. In some examples, the cleaning system includes a connection (e.g., an integral connector) that allows for connection of a cleaning fluid (e.g., compressed air or pressurized water hose) and the cleaning system includes tubing or ducting with directional vanes, nozzles, or sweeping jet fluidic actuators to direct the cleaning fluid to the filter. The ducting, nozzles, or actuators can be customized to the size of the filter to maximize cleaning efficiency. Cleaning can take place with the filter installed on the platform, simplifying and reducing maintenance time. Example filtration devices disclosed herein can include a bypass system that can be configured to provide flow area and opening pressure to satisfy unique platform requirements. In some examples, a cleanout slot is included in the housing and a blocking plate can be removably coupled to the housing to isolate downstream system components during filter cleaning to prevent debris and/or cleaning fluid from flowing downstream of the filter system.

Figure 1A:
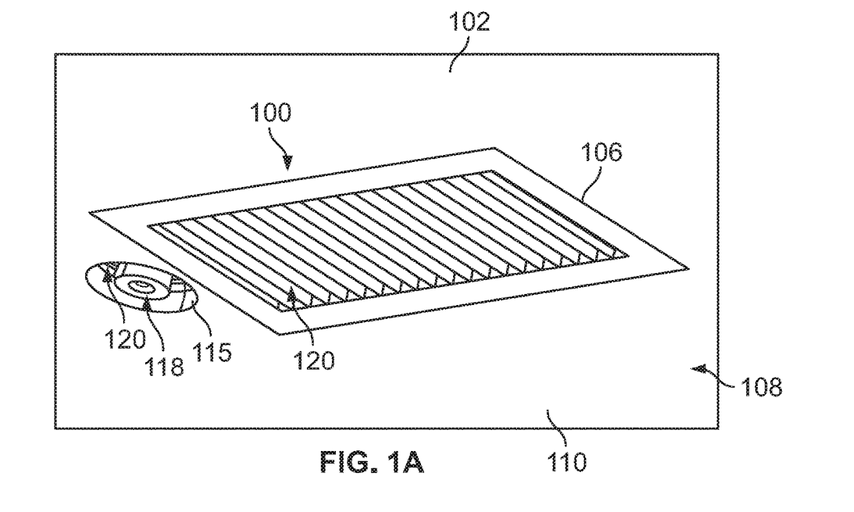
FIGS. 1A and 1B are perspective views of an example filtration apparatus in accordance with teachings of this of this disclosure.
Figure 1B:
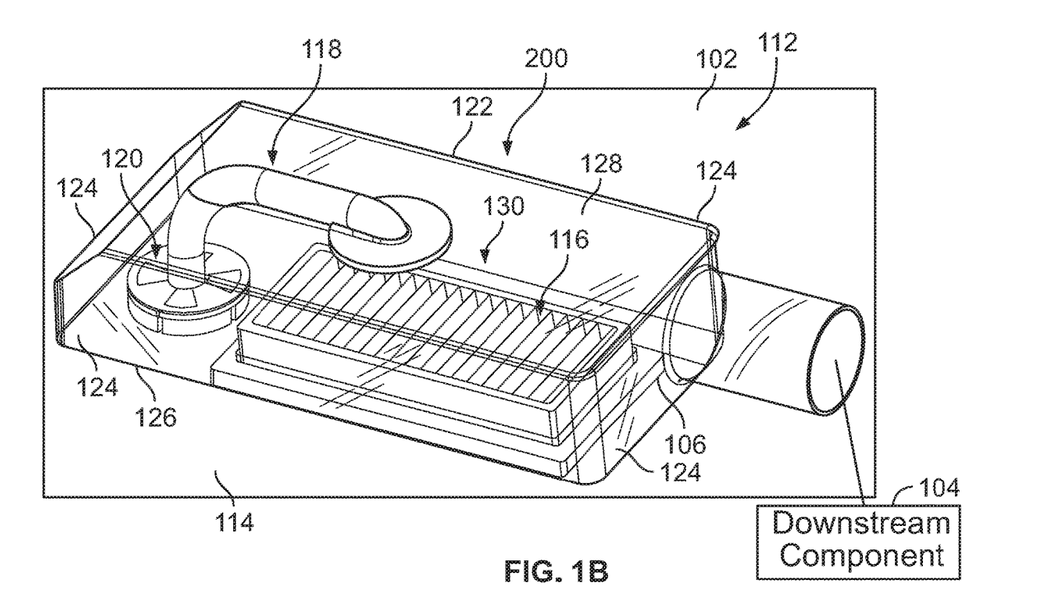

FIGS. 1A and 1B are perspective views of an example filtration apparatus 100 constructed in accordance with teachings of this disclosure. The filtration apparatus 100 (e.g., a filtration device) of the illustrated example is coupled to a platform 102 and is in fluid communication with a downstream component 104. Specifically, the filtration apparatus 100 provides or supplies filtered fluid (e.g., air) to the downstream component 104. The platform 102 of the illustrated example can be a frame or surface of a vehicle, an aircraft, a building, a compressor, etc. The downstream component 104 of the illustrated example can be a compressor, a pump, an engine inlet, etc.

To receive the filtration apparatus 100, the platform 102 of the illustrated example includes a primary opening 106. The primary opening 106 is formed between a first side 108 (e.g., an exterior side, an outer mold line (OML)) or a first surface 110 (e.g., an exterior surface) of the platform 102 and a second side 112 (e.g., an interior side, an inner mold line (IML)) or a second surface 114 (e.g., an interior surface) of the platform 102. The platform 102 of the illustrated example includes a secondary opening 115 (e.g., an access port) that is separate from and adjacent the primary opening 106.

The filtration apparatus 100 of the illustrated example includes a filtration system 116 and a cleanout system 118. The filtration system 116 of the illustrated example provides or supplies filtered fluid flow (e.g., airflow) to the downstream component 104. The cleanout system 118 enables cleaning of the filtration system 116 (e.g., removal of particulate from the filtration system 116) without removing portions or components of the filtration system 116 from the filtration apparatus 100. Additionally, the filtration apparatus 100 of the illustrated example includes a bypass system 120. The bypass system 120 of the illustrated example enables fluid flow to the downstream component 104 when a fluid flow through the filtration system 116 is less than a fluid flow threshold.

To house the filtration system 116, the cleanout system 118 and the bypass system 120, the filtration apparatus 100 of the illustrated example includes a housing 122. The housing 122 of the illustrated example is removably coupled to the platform 102 (e.g., a frame, a support structure, a beam, a stud, etc.). The housing 122 of the illustrated example includes side walls 124, a first wall 126 (e.g., an outer wall), and a second wall 128 (e.g., an inner wall) that define a cavity 130. The first wall 126 is substantially parallel relative to the second wall 128. The first wall 126 and the second wall 128 are substantially perpendicular to the side walls 124. In other words, the housing 122 of the illustrated example has a rectangular shape or profile. However, in some examples, the housing 122 can have a circular shape and/or any other shape or profile. The first wall 126 of the illustrated example is oriented toward or supported by second surface 114 of the platform 102, and the side walls 124 and the second wall 128 project toward the second side 112 of the platform 102. In some examples, the filtration apparatus 100 does not include the bypass system 120.

Figure 2:
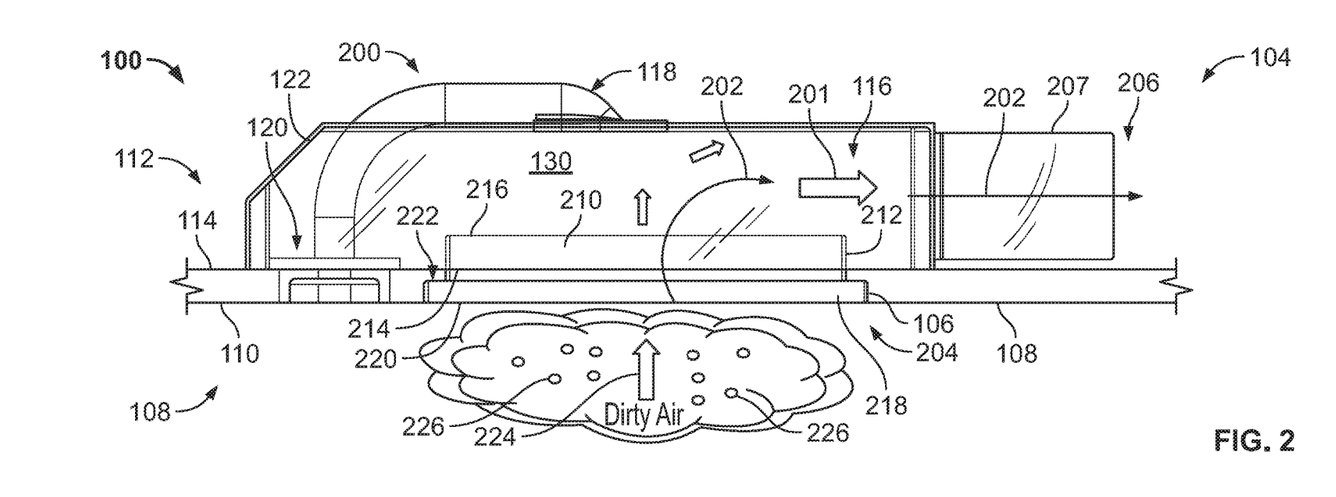
FIG. 2 is a side view of the example filtration apparatus of FIGS. 1A and 1B shown in a filtration mode.

FIG. 2 illustrates the example filtration apparatus 100 of FIGS. 1A and 1B in a filtration mode 200. In the filtration mode 200, the filtration system 116 of the illustrated example provides filtered fluid 201 (e.g., filtered airflow) to the downstream component 104 (FIG. 1B). The filtration system 116 of the illustrated example provides a filtration passageway 202 (e.g., a primary passageway) between a filtration inlet 204 (e.g., a primary inlet) and a filtration outlet 206 (e.g., a primary outlet). The housing 122 of the illustrated example defines the filtration passageway 202 (e.g., via the cavity 130) between the filtration inlet 204 and the filtration outlet 206. The filtration inlet 204 of the illustrated example is oriented toward or in fluid communication with the first side 108 of the platform 102 (e.g., the atmosphere) and the filtration outlet 206 of the illustrated example is oriented toward or in fluid communication with the downstream component 104 (FIG. 1B). In the illustrated example, the filtration inlet 204 is flush mounted relative to the first surface 110 of the platform 102 and the filtration outlet 206 is located in the second side 112 of the platform 102. The filtration outlet 206 of the illustrated example is a fitting 207 (e.g., a pipe) to couple to the downstream component 104. The fitting 207 of the illustrated example is integrally formed with the housing 122.

To provide the filtered fluid 201 (e.g., filter airborne particulate), the filtration system 116 of the illustrated example includes a filter 210 located in the filtration passageway 202. Specifically, the filter 210 of the illustrated example is positioned in the cavity 130 of the housing 122. To position the filter 210 in the cavity 130, the first wall 126 of the housing 122 includes an access 212 (e.g., a cutout, an opening, etc.). Specifically, the filter 210 of the illustrated example includes a first side 214 (e.g., a non-filtered side, a front face side, or upstream side) adjacent or defining the filtration inlet 204 and a second side 216 (e.g., a filtered side, a back face side, or a downstream side) opposite the first side 214 in fluid communication with the filtration outlet 206. The first side 214 of the filter 210 is oriented toward the first side 108 (e.g., the atmosphere) of the platform 102 and the second side 216 is oriented toward the cavity 130.

Figure 8:
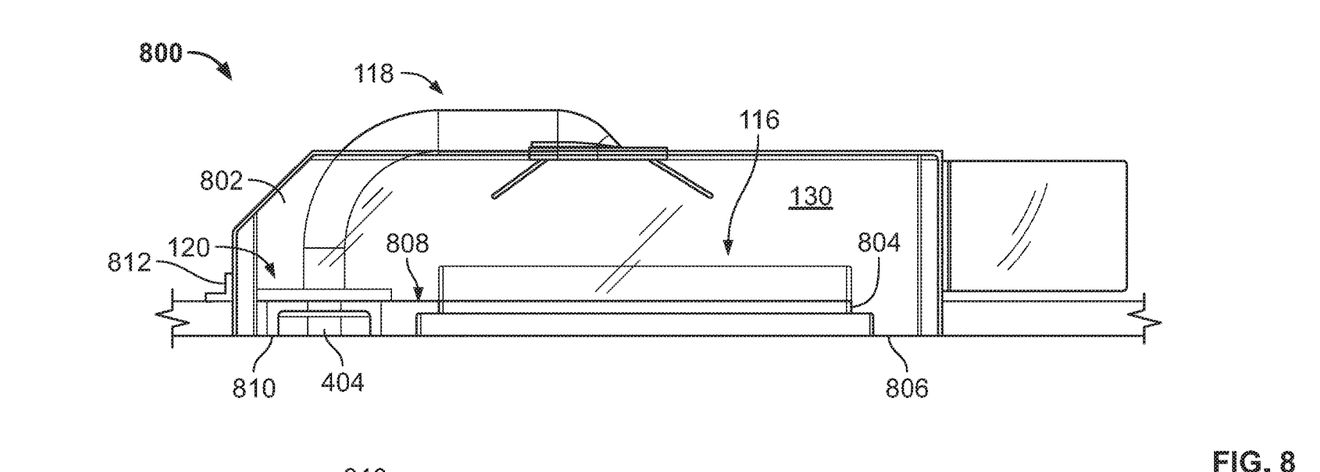
FIG. 8 is a side view of another example filtration apparatus disclosed herein.

To retain the filter 210 in the cavity 130 and/or coupled to the housing 122, the filtration apparatus 100 of the illustrated example includes a panel 218 (e.g., cover, a filter cartridge or frame). The panel 218 of the illustrated example is oriented toward (e.g., accessible from) the first side 108 (e.g., the outer surface) of the platform 102. For example, the primary opening 106 of the platform 102 enables access to the cavity 130 from first side 108 (e.g., the outer surface) of the platform 102. When coupled to the filtration apparatus 100, an outer surface 220 of the panel 218 of the illustrated example is flush mounted with the first surface 110 of the platform 102. In other words, the outer surface 220 of the panel 218 and the first surface 110 of the platform 102 provide a relatively smooth transition between the panel 218 and the platform 102. To couple the panel 218 to the platform 102, the panel 218 and the platform 102 of the illustrated example form a step interface 222 (e.g., opposing shoulders or surfaces). The step interface 222 enables the panel 218 to removably couple to the platform 102 via a snap-fit or interference-fit connection. In some examples, the step interface 222 enables the panel 218 to couple to the platform 102 via a fastener. In some examples, the panel 218 couples directly to the housing 122 of the filtration apparatus 100 without coupling or fastening to the platform 102 (e.g., an example of which is shown in FIG. 8). The panel 218 of the illustrated example includes an opening to enable fluid communication between the first side 108 of the platform 102 (e.g., the atmosphere) and the first side 214 of the filter 210.

In operation, the filtration apparatus 100 of the illustrated example provides the filtered fluid 201 to the downstream component 104 (FIG. 1B) in the filtration mode 200. For example, the filtration system 116 of the illustrated example supplies filtered fluid (e.g., airflow) from the first side 108 of the platform 102 (e.g., the atmosphere) to the downstream component 104. In particular, the downstream component 104 demands fluid (e.g., draws airflow) from the filtration passageway 202. Specifically, unfiltered fluid 224 from outside of the housing 122 or the cavity 130 is drawn into the cavity 130 through the filter 210. As the unfiltered fluid 224 flows from outside of the housing 122 into the cavity 130 of the housing 122, the unfiltered fluid 224 passes through the filter 210 between the first side 214 of the filter 210 and the second side 216 of the filter 210. The filter 210 of the illustrated example captures particulate 226 (e.g., airborne particular, debris, sand, dirt, etc.) in the unfiltered fluid 224 to provide the filtered fluid 201 into the cavity 130. The filtered fluid 201 is provided to the downstream component 104 via the filtration outlet 206 of the housing 122. During the filtration mode 200, the cleanout system 118 is in a closed position to prevent fluid flow (e.g., airflow) between an exterior area of the housing 122 (e.g., the first side 108 and/or the second side 112) and the cavity 130 of the housing 122. Additionally, during the filtration mode 200, the bypass system 120 is in a closed position to prevent or restrict fluid flow (e.g., airflow) between an exterior area of the housing 122 (e.g., the first side 108 and/or the second side 112) and the cavity 130 of the housing 122.

Figure 3A:
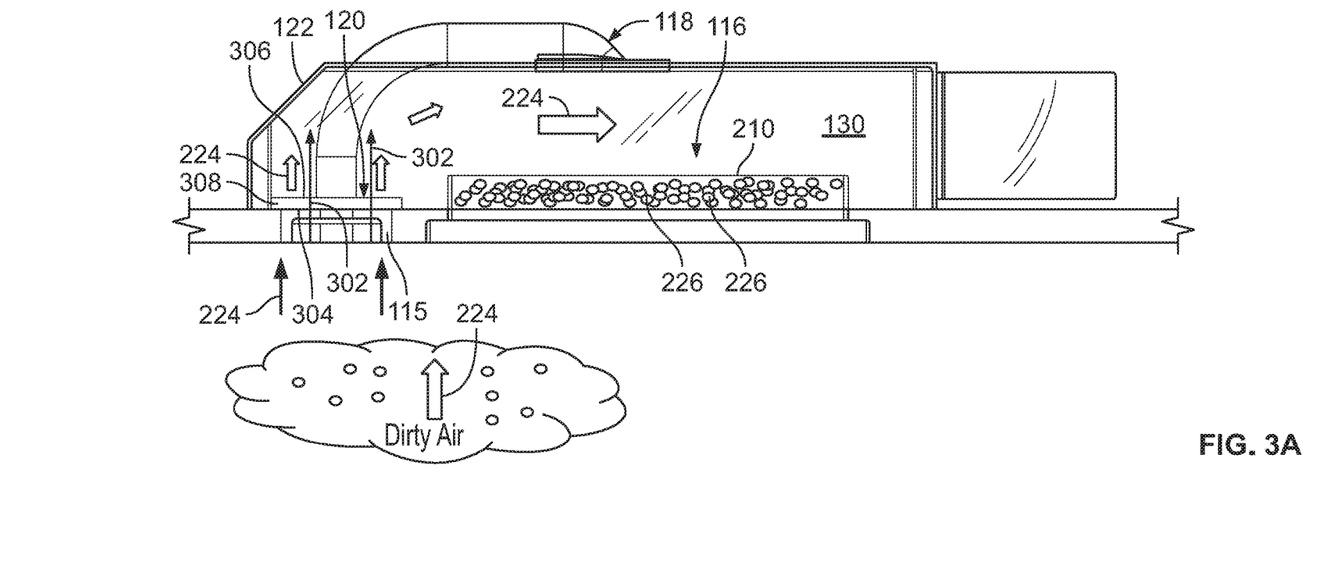
FIG. 3A is a side view of the example filtration apparatus of FIGS. 1A and 1B shown in a bypass mode.
Figure 3B:
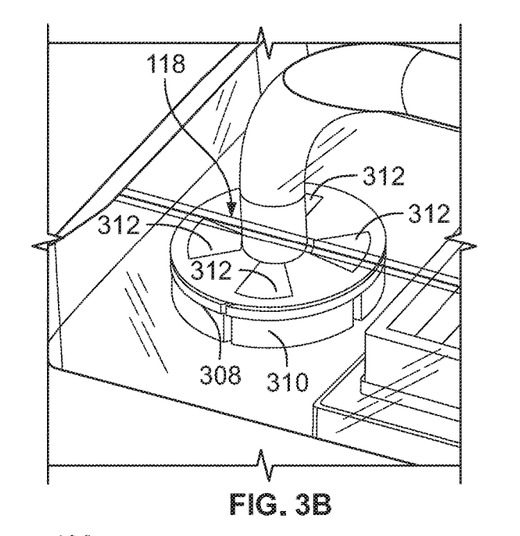
FIG. 3B is a partial, perspective view of the example filtration apparatus of FIG. 3A.

FIG. 3A is a side view of the example filtration apparatus 100 of FIGS. 1A and 1B shown in a bypass mode 300. FIG. 3B is a partial, perspective view of the bypass system 120 of FIGS. 1A and 1B. The bypass system 120 of the illustrated example includes a bypass passageway 302 between a bypass inlet 304 (e.g., a second inlet) and a bypass outlet 306 (e.g., a second outlet). The bypass inlet 304 of the illustrated example is in fluid communication with the first side 108 of the platform 102 and the bypass outlet 306 is in fluid communication with the cavity 130. Specifically, the bypass inlet 304 is in fluid communication with the secondary opening 115 of the platform 102 and can receive the unfiltered fluid 224 from the first side 108 of the platform 102. The filtration apparatus 100 of the illustrated example includes the bypass system 120 to enable fluid flow from an exterior of the housing 122 (e.g., the first side 108 of the platform 102) to the cavity 130 when fluid flow is restricted via the filtration passageway 202 (e.g., the filter).

To enable the unfiltered fluid 224 to flow to the cavity 130, the bypass system 120 of the illustrated example includes a bypass valve 308. In particular, the bypass valve 308 moves between the open position and the closed position based on a pressure differential between a pressure outside of the cavity 130 (e.g., at the first side 108 of the platform 102 or outside of the housing 122) and a pressure inside of the cavity 130 (e.g., inside of the housing 122). Specifically, the bypass valve 308 moves to an open position when a pressure in the cavity 130 is less than an opening pressure (e.g., a cracking pressure) of the bypass valve 308. The bypass valve 308 moves to the closed position to prevent fluid flow across the bypass valve 308 when the pressure in the cavity 130 is greater than the opening pressure (e.g., the cracking pressure) of the bypass valve 308. For example, the bypass valve 308 can be configured to open when the pressure inside the cavity 130 is in vacuum, between 0 and 5 pounds per square inch (psi) and/or any other pressure value. In some examples, the bypass valve 308 moves to an open position when a pressure differential across the bypass valve 308 exceeds a pressure threshold. For example, the bypass valve 308 can be configured to open when a pressure differential across the bypass valve 308 is between approximately 2 (psi) and 10 (psi), or any other pressure value or range.

Referring to FIG. 3B, the bypass valve 308 of the illustrated example is a one-way valve. The bypass valve 308 of the illustrated example includes a flange 310 (e.g., a housing) having a plurality of valves 312 radially spaced (e.g., ninety-degrees apart) relative to a central axis of the flange 310. The valves 312 of the illustrated example are each moveable between an open position to allow fluid flow to the cavity 130 and a closed position to prevent fluid flow to the cavity 130. The valves 312 of the illustrated can be flaps, umbrella valves, rubber valves, spring loaded valves, one-way valves and/or any other valve apparatus that operates based on a pressure differential between a pressure outside of the cavity 130 and a pressure inside of the cavity 130. In some examples, the bypass valve 308 can be a control valve that can be activated between a closed position and an open position via a control signal when a control system detects a pressure differential between the exterior of the housing 122 and the cavity 130 of the housing 122.

In operation, referring to FIGS. 3A and 3B, if the filter 210 of the filtration apparatus 100 becomes clogged with particulate 226, the filter 210 can restrict or prevent fluid flow through the filtration passageway 202 (e.g., through the filter 210). For example, restricted airflow through the filtration passageway 202 (e.g., through the filter 210) can cause a significant pressure drop (e.g., a vacuum) in the cavity 130 when the downstream component 104 demands fluid. To prevent damage or a performance reduction to the downstream component 104 due to a lack of fluid flow through the filtration passageway 202, the filtration apparatus 100 operates in the bypass mode 300 in which the bypass valve 308 enables fluid flow through the bypass passageway 302. For example, when the pressure differential across the bypass valve 308 (e.g., a difference between a pressure outside of the housing 122 and a pressure in the cavity 130) is greater than a pressure threshold or pressure setting of the bypass valve 308 (e.g. $P_{outside} - P_{inside} > P_{threshold}$), the bypass valve 308 moves from a closed position to an open position to allow the unfiltered fluid 224 from outside of the housing 122 to enter the cavity 130. For example, the pressure of the unfiltered fluid 224 at the bypass inlet 304 can be at atmospheric pressure and the pressure in the cavity 130 and downstream from the bypass outlet 306 can be at a pressure that is less than atmospheric pressure (e.g., a differential pressure of 5 psi). As a result, in the bypass mode 300, the unfiltered fluid 224 from outside of the housing 122 (e.g., from the first side 108 of the platform 102) is allowed to flow in the cavity 130 of the housing 122 via the bypass valve 308 and, thus, to the downstream component 104. During the bypass mode 300, the cleanout system 118 is in the closed position. In contrast, fluid does not pass through the bypass valve 308 during the filtration mode 200 of FIG. 2. Specifically, in the filtration mode 200, the bypass valve 308 remains in the closed position so long as a pressure differential across the bypass valve 308 (e.g., between the bypass inlet 304 and the bypass outlet 306) does not exceed a pressure threshold.

Figure 4:
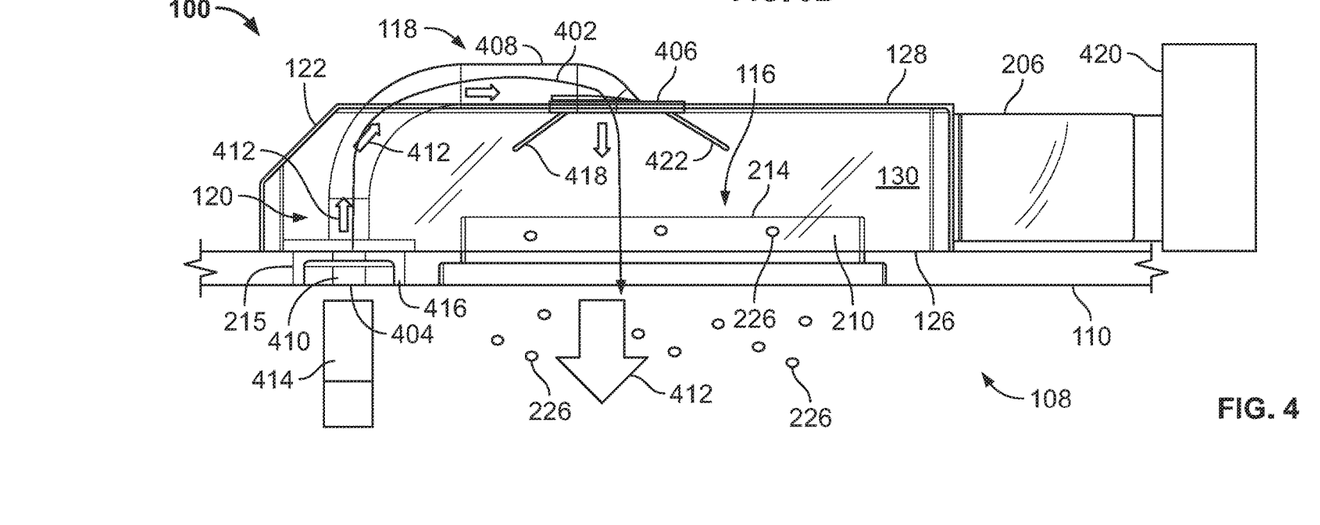
FIG. 4 is a side view of the example filtration apparatus of FIGS. 1A and 1B shown in a cleanout mode.

FIG. 4 illustrates the example filtration apparatus 100 of FIGS. 1A and 1B in a cleanout mode 400 (e.g., a cleaning mode). To clean particulate 226 entrapped by the filter 210, the filtration apparatus 100 of the illustrated example includes the cleanout system 118. The cleanout system 118 of the illustrated example includes a cleanout passageway 402 (e.g., a secondary passageway) defining a cleanout inlet 404 (e.g., a secondary inlet) and a cleanout outlet 406 (e.g., a secondary outlet). The cleanout inlet 404 of the illustrated example is accessible from the first surface 110 (e.g., an outer surface) of the platform 102 and the cleanout outlet 406 in fluid communication with the filter 210. Specifically, the cleanout inlet 404 of the illustrated example is accessible via the secondary opening 215 of the first surface 110 of the platform 102 and the cleanout outlet 406 is oriented toward the second side 216 of the filter 210. For example, the cleanout inlet 404 is adjacent the first wall 126 (e.g., passes through the first wall 126) of the housing 122 and the cleanout outlet 406 is adjacent (e.g., is coupled to) the second wall 128 of the housing 122 opposite the first wall 126.

The cleanout passageway 402 of the illustrated example includes a pipe 408 (e.g., a duct, a hose, a PVC pipe, etc.). The cleanout passageway 402 of the illustrated example is isolated from the filtration passageway 202 when the cleanout outlet 406 is in a closed position. In other words, when the cleanout outlet 406 is in the closed position, the cleanout passageway 402 and the filtration passageway 202 (e.g., the cavity) 130 are fluidly isolated (e.g., are not in fluid communication) The cleanout passageway 402 of the illustrated example includes a first portion 408a positioned inside the cavity 130 of the housing 122 and a second portion 408b extending outside of the housing 122 (e.g., through the second wall 128). In some examples, the cleanout passageway 402 (e.g., an entire length of the pipe 408 between the cleanout inlet 404 and cleanout outlet 406) is positioned inside the cavity 130 (e.g., does not extend outside of the housing 122). In some examples, the cleanout passageway 402 (e.g., an entire length of the pipe 408 between the cleanout inlet 404 and cleanout outlet 406) is positioned outside of the cavity 130 of the housing 122.

The cleanout inlet 404 of the illustrated example includes a cleanout fitting 410 to receive a cleaning fluid 412 from a supply source 414 (e.g., a hose or tubing) to provide the cleaning fluid 412 to the cleanout system 118. The cleanout fitting 410 of the illustrated example can be a quick-connect hose fitting, a threaded fitting and/or any other fitting to receive the supply source 414. The cleanout inlet 404 is accessible via the secondary opening 215. To this end, the cleanout inlet 404 of the illustrated example is recessed relative to the first surface 110 of the platform 102. In other words, the cleanout inlet 404 does not protrude from the first side 108 of the platform 102. In some examples, an inner wall 416 of the platform 102 formed by the secondary opening 215 guides or aligns the supply source 414 and the cleanout inlet 404.

The cleanout outlet 406 is supported by the housing 122. In particular, the cleanout outlet 406 of the illustrated example is coupled to the second wall 128 of the housing 122. The cleanout outlet 406 includes a cleanout valve 418. The cleanout valve 418 of the illustrated example can be a one-way valve, a flap valve, a check valve, a wafer check valve, and/or any other fluid control device (e.g., valve) to control fluid flow through the cleanout outlet 406. For example, the cleanout valve 418 of the illustrated example is biased (e.g., spring-loaded) to the closed position to prevent or restrict fluid through the cleanout passageway 402 when the cleaning fluid 412 is not provided in the cleanout passageway 402. In some examples, the cleanout valve 418 is a pressure-activated valve. For example, the cleanout valve 418 moves to an open position when a force (e.g. provided by the cleaning fluid 412) imparted to the cleanout valve 418 is greater than a biasing force (e.g., a spring force) provided by a biasing element (e.g., a hinge spring) of the cleanout valve 418.

In the cleanout mode 400, the cleanout system 118 enables removal of the particulate 226 (e.g., debris, sand, dirt, etc.) from the filter 210 without removing the filter 210 from the housing 122. To clean the filter 210, the cleaning fluid 412 is provided (e.g., injected) into the cleanout passageway 402 via the cleanout inlet 404. To receive the cleaning fluid 412, the supply source 414 (e.g., a hose) supplying the cleaning fluid 412 couples to the cleanout inlet 404 (e.g., the cleanout fitting 410). The cleaning fluid 412 can be pressurized air, pressurized water, a cleaning agent, a combination thereof, and/or any other fluid(s).

When the cleaning fluid 412 is provided to the cleanout passageway 402, the cleaning fluid 412 flows from the cleanout inlet 404 to the cleanout outlet 406. The cleaning fluid 412 causes the cleanout outlet 406 (e.g., the cleanout valve 418) to move to an open position to enable the cleaning fluid 412 to flow inside the cavity 130 of the housing 122. Specifically, the cleaning fluid 412 is directed toward the second side 216 of the filter 210 (e.g., at a relatively high pressure). Specifically, the cleaning fluid 412 flows from the second side 216 of the filter 210, through the filter 210, and exits from the first side 214 of the filter 210. The cleanout system 118 of the illustrated example includes a guide or vane 422 to guide the cleaning fluid 412 toward the filter 210. In some examples, the guide or vane 422 is fixed to the cleanout outlet 406 and/or the second wall 128 of the housing 122.

Thus, in the cleanout mode 400, the cleaning fluid 412 flows through the filter 210 in a direction (e.g., from the second side 216 to the first side 214 of the filter 210) that is opposite to a direction (e.g., from the first side 214 to the second side 216) of the filtered fluid 201 when the filtration apparatus 100 operates in the filtration mode 200. The cleaning fluid 412 exits the platform 102 via the first side 214 of the filter 210 and/or through the panel 218 (e.g., and into the atmosphere). In some examples, the cleaning fluid 412 is captured in a container when it exits the housing 122 via the first side 214 of the filter 210. As the cleaning fluid 412 passes through the filter 210 from the second side 216 of the filter 210 to the first side 214 of the filter 210 and exits the housing 122, the cleaning fluid 412 removes the entrapped particulate 226 from the filter 210. As a result, the cleaning fluid 412 cleans the filter 210 to unclog the filter 210. In particular, the cleaning fluid 412 cleans the filter 210 without having to remove the filter 210 from the housing 122 and/or the platform 102.

During the filtration mode 200, the cleanout system 118 is in a closed position to prevent fluid flow (e.g., airflow through the cleanout passageway 402) between the cleanout inlet 404 and the cleanout outlet 406. For example, absent the cleaning fluid 412 in the cleanout passageway 402, the cleanout valve 418 moves to the closed position, thereby isolating or fluidly decoupling the cleanout passageway 402 and the cavity 130. Additionally, during the cleanout mode 400, the bypass system 120 is in the closed position to prevent airflow between the bypass inlet 304 and the bypass outlet 306. In other words, the cleaning fluid 412 increases a pressure in the cavity 130 or on the second side of the bypass valve 308, which prevents the bypass valve 308 from moving to an open position to allow fluid flow therethrough.

To prevent or restrict cleaning fluid 412 from flowing through the filtration outlet 206 during a cleaning operation, a shut-off valve 420 is located downstream from the filtration outlet 206. The shut-off valve 420 can be a manually operated valve, a control valve, and/or any other valve that prevents cleaning fluid 412 from flowing downstream of the filtration outlet 206 during a cleaning operation. In some examples, the shut-off valve 420 is integrated with the filtration outlet 206 and/or the fitting 207. In some examples, the shut-off valve 420 is accessible from the first side 108 of the platform 102. In some examples, the shut-off valve 420 is not needed or provided.

FIGS. 5, 6, 7A, 7B and 8 illustrate other example filtration apparatus 500-800 disclosed herein. Those components of the example filtration apparatus 500-800 of FIGS. 5, 6, 7A, 7B and 8 that are substantially similar or identical to the components of the filtration apparatus 100 described above and that have functions substantially similar or identical to the functions of those components will not be described in detail again below. Instead, the interested reader is referred to the above corresponding descriptions. To facilitate this process, identical reference numbers will be used for like structures.

Figure 5:
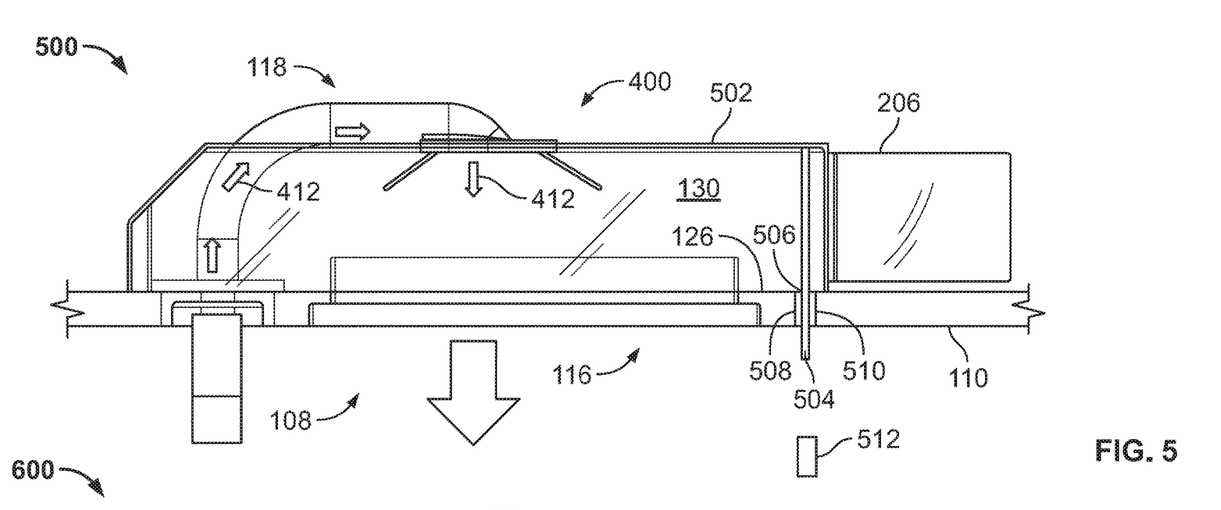
FIG. 5 is a side view of another example filtration apparatus disclosed herein shown in a cleanout mode.

Referring to FIG. 5, the filtration apparatus 500 is shown in a cleanout mode 400. To prevent a cleaning fluid 412 and/or particulate 226 from flowing downstream from a filtration outlet 206 during a cleaning operation, the filtration apparatus 500 includes a housing 502 having a blocker plate 504. For example, the blocker plate 504 can be employed instead of the shut-off valve 420 of FIG. 4 or in combination with the shut-off valve 420. The blocker plate 504 of the illustrated example is removably coupled to the housing 502 via a first slot 506 formed in the housing 502. The first slot 506 is formed in a first wall 126 of the housing 502 to allow the blocker plate 504 to access a cavity 130 of the housing 502 via a first side 108 of a platform 102 when the blocker plate 504 is positioned in the first slot 506. Specifically, the blocker plate 504 protrudes into the cavity 130 of the housing 502 to block or restrict (e.g., impede) fluid flow to the filtration outlet 206 of the filtration system 116 when the blocker plate 504 is coupled to the housing 502. In other words, the blocker plate 504 projects (e.g., is cantilevered) into the cavity 130 from the first wall 126 of the housing 502. The blocker plate 504 of the illustrated example includes a seal 508 to restrict or prevent fluid exiting or escaping from the cavity 130 to the first side 108 (e.g., the atmosphere) via the second slot 510 when the filtration apparatus 500 is operating in a cleanout mode 400 (e.g., as shown in FIG. 5).

To enable access to the first slot 506, the platform 102 of the illustrated example includes a second slot 510 in alignment with the first slot 506. In some examples, the second slot 510 of the platform 102 includes a seal or plug to restrict or prevent fluid exiting or escaping from the cavity 130 to the first side 108 (e.g., the atmosphere) via the second slot 510 when the filtration apparatus 500 is operating in a filtration mode 200 (e.g., when the blocker plate 504 is removed from the housing 502). To insert the blocker plate 504, a plug 512 is removed from the platform 102 to allow access to the second slot 510. The plug 512 can be rigid or compressible. The plug 512 can include rubber, plastic, metal, and/or any other suitable material(s). In some examples, the platform 102 and/or the first wall 126 of the housing 502 include flaps, spring-loaded flaps, doors, and/or any other structure to enable the blocker plate 504 to be positioned in the cavity 130.

Figure 6:
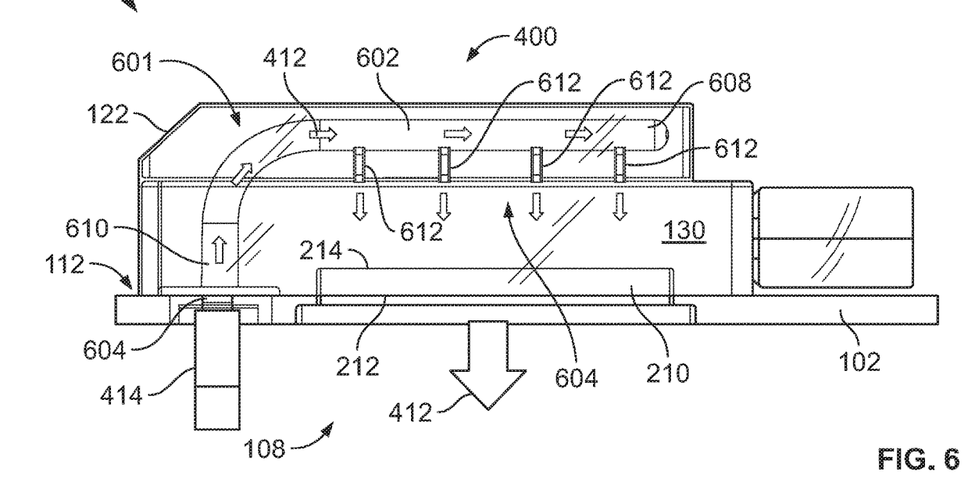
FIG. 6 is a side view of another example filtration apparatus disclosed herein shown in a cleanout mode.

FIG. 6 is a side view of another example filtration apparatus 600 disclosed herein shown in a cleanout mode 400. A cleanout system 601 of the illustrated example includes a cleanout passageway 602 between a cleanout inlet 604 and a cleanout outlet 606. The cleanout passageway 602 of the illustrated example is a tube or pipe 608 (e.g., a duct or plenum) positioned inside a cavity 130 of a housing 122. To prevent fluid flow through the cleanout passageway 602 when the filtration apparatus 600 is in a filtration mode 200 or a bypass mode 300, the cleanout passageway 602 of the illustrated example includes a cleanout valve 610 (e.g., a one-way valve). For example, the cleanout valve 610 of the illustrated example is positioned adjacent the cleanout inlet 604. The cleanout valve 610 moves to the open position when a supply source 414 (e.g., a hose) is coupled to the cleanout inlet 604 and provides a cleaning fluid 412 (e.g., pressurized air, pressurized water, etc.) to the cleanout inlet 604. When the cleaning fluid 412 (e.g., the supply source 414) is removed from the cleanout inlet 604, the cleanout valve 610 moves to a closed position to prevent fluid flow through the cleanout passageway 602. For example, when the cleanout valve 610 is in the closed position, the cleanout passageway 602 is fluidly isolated (e.g., is not in fluid communication with) the filtration passageway 202 and/or the cavity 130 of the housing 122. When the cleanout valve 610 is in the open position, fluid provided at the first side 108 of the platform 102 can be fluidly coupled to the cavity 130 of the housing 122 positioned on the second side 112 of the platform 102. The cleanout valve 610 of the illustrated example can be a one-way valve (e.g., a spring loaded ball valve) and/or any other fluid control device.

Unlike the cleanout passageway 402 of FIG. 4, the cleanout passageway 602 of the illustrated example is entirely disposed or contained within the cavity 130 of the housing 122. For example, no portion of the cleanout passageway 602 between the cleanout inlet 604 and the cleanout outlet 606 is exposed or positioned outside of the cavity 130 of the housing 122. Further, the cleanout outlet 606 of the illustrated example includes one or more nozzles 612. The nozzles 612 direct the cleaning fluid 412 onto a second side 216 of a filter 210 positioned in a filtration passageway 202, which loosens and removes the particulate 226 (e.g., dust and dirt particles) collected on a first side 214 (e.g., a non-filtered side) of the filter 210. The nozzles 612 of the illustrated example are adjustable to adjust (e.g., increase or decrease) a characteristic (e.g., a pressure, a velocity, a spray pattern, etc.) of the cleaning fluid 412 exiting the nozzles 612 toward the second side 216 of the filter 210. The cleanout system 601 of the illustrated example includes four nozzles 612. However, any number of nozzles 612 (e.g., less than four, greater than four) can be used to implement the cleanout system 601 of FIG. 6.

Figure 7A:
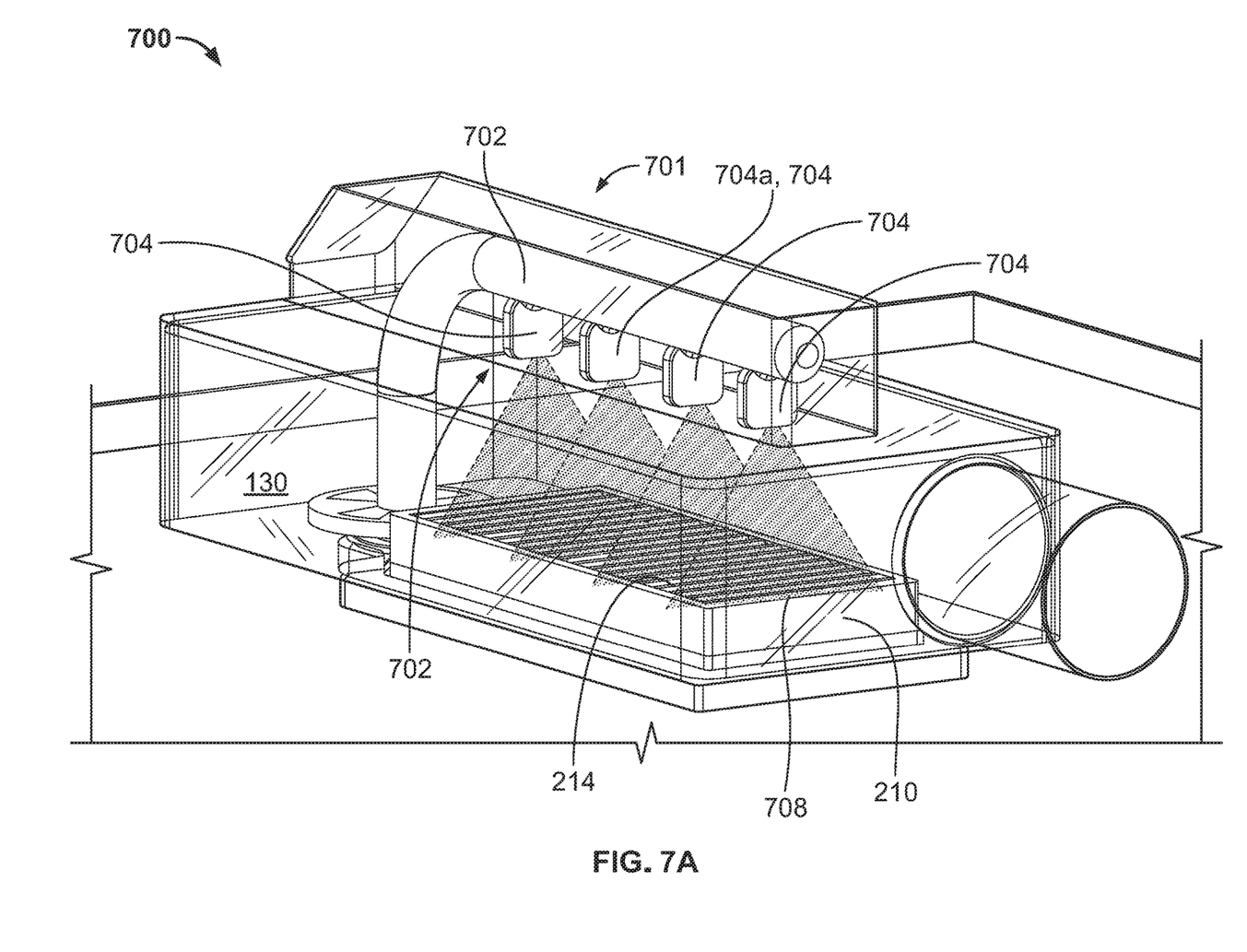
FIGS. 7A and 7B are perspective views of yet another example filtration apparatus disclosed herein shown in a cleanout mode.
Figure 7B:
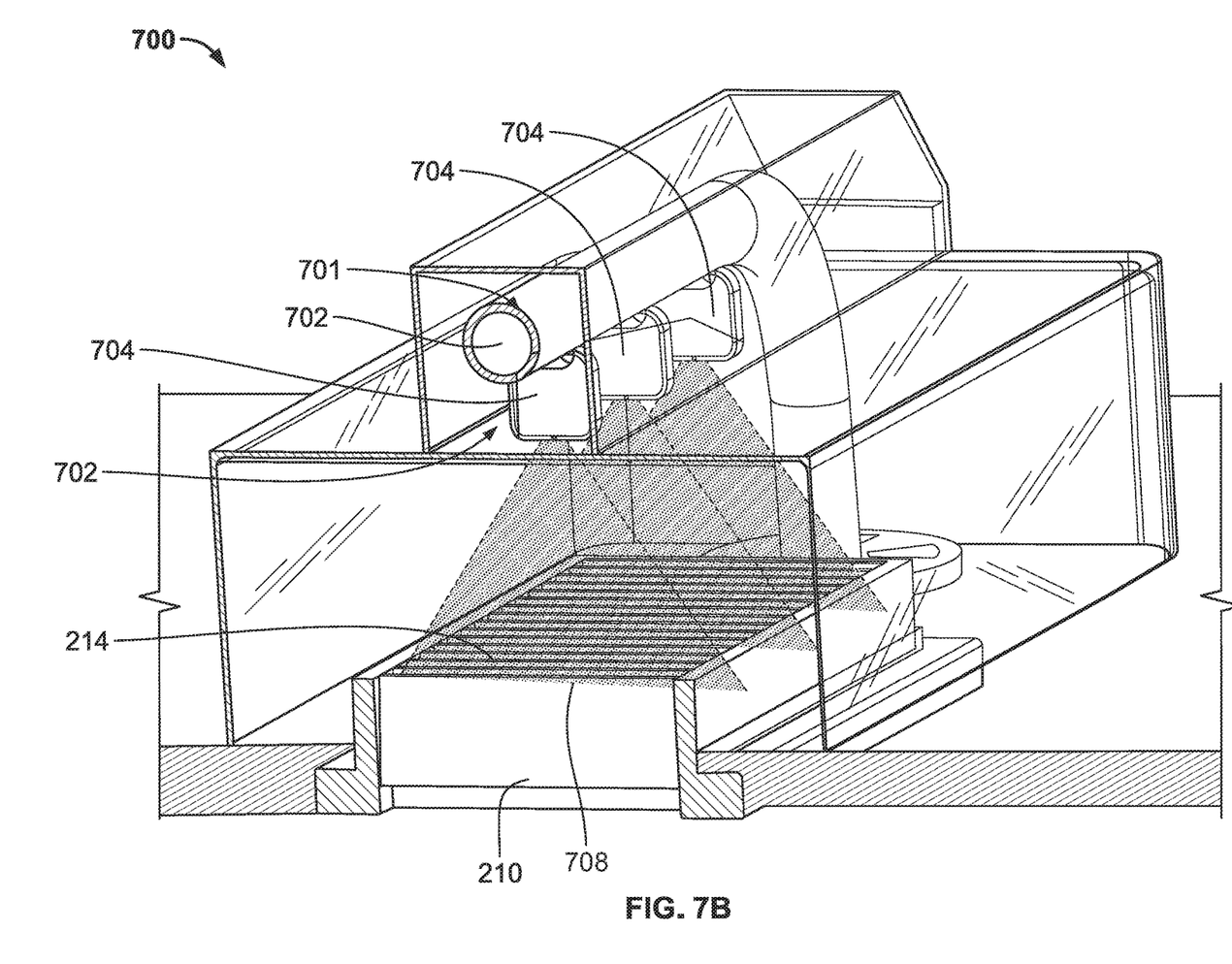

FIGS. 7A and 7B are perspective views another example filtration apparatus 700 disclosed herein. The filtration apparatus 700 of FIGS. 7A and 7B has a cleanout system 701 that is substantially similar to the cleanout system 601 of FIG. 6 except a cleanout outlet 702 of the example filtration apparatus 700 includes one or more directional vanes or fluidic actuators 704 (e.g., sweeping jet actuators). The actuators 704 enhance cleaning by directing the cleaning fluid 412 at a much wider angle or surface area than the nozzles 612 of the example filtration apparatus 600 of FIG. 6. A single sweeping jet actuator 704a or an array of actuators 704 can be configured to cover an entire surface area of a second side 216 of a filter 210 positioned in a cavity 130 of a housing 122. Each of the sweeping jet actuators 704 provides a sweeping fluid pattern 708 that covers an (e.g., entire) width of the filter 210.

FIG. 8 is a side view of another example filtration apparatus 800 disclosed herein. The filtration apparatus 800 of the illustrated example includes a filtration system 116, a cleanout system 118 and a bypass system 120. The filtration apparatus 800 has a housing 802. For example, the housing 802 of the illustrated example includes a primary opening 804 that receives and/or provides access to a filter 210 positioned in a cavity 130 of the housing 802. Specifically, the primary opening 804 is formed on a first wall 806 of the housing 802. Additionally, the housing 802 of the illustrated example or retains the filter 210 in the cavity 130 via a panel 208. The first wall 806 of the housing 802 and the panel 208 form a shoulder interface 808 to removably couple the panel 208 to the housing 802.

The housing 802 is different from the housing 122 of the filtration apparatus 100 of FIGS. 1A and 1B. For example, the housing 802 of the illustrated example includes a secondary opening 810 (e.g., an auxiliary opening) to provide access to a cleanout inlet 404 of the cleanout system 118 and/or a bypass inlet 304 of the bypass system 120. In particular, the secondary opening 810 is formed through the first wall 806 of the housing 802. The filtration apparatus 800 of the illustrated example can be implemented with a platform 812 without having to modify the platform 812 with a primary opening (e.g., the primary opening 106 of the platform 102 of FIGS. 1A and 1B) and/or the secondary opening (e.g., the secondary opening 115 of FIGS. 1A and 1B) to provide access to the cleanout system 118 (e.g., the cleanout fitting 410) and/or the bypass system 120 (e.g., the bypass valve 308). In FIG. 8, an outer surface 814 of the first wall 806 is flush mounted relative to a first surface 816 (e.g., an outer surface) of the platform 812 when the housing 802 is coupled to the platform 812. In some examples, the outer surface 814 of the housing 802 and/or the panel 208 can be recessed relative to the first surface 816 of the platform 812. In some examples, the filtration apparatus 800 can be coupled to the platform via a bracket (e.g., an L-shaped bracket, etc.), a weld, and/or any other fastener(s). In some examples, the filtration apparatus 800 can retrofit existing aircraft.

Although each example filtration apparatus disclosed above has certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. In some examples, a filtration apparatus disclosed in accordance with the teachings of this disclosure may have a combination of the housings 122, 502, 802 and the cleanout systems 118, 601, 701, disclosed herein.

In some examples, the filtration apparatus 100-800 and/or the filtration system 116 provides means for filtering fluid for use by the downstream component 104. In some examples, the filter 210 provides means for filtering fluid or airflow. In some examples, the cleanout systems 118, 601, 701 provide means for cleaning the filtration system 116 and/or the filter 210 without removing any of the components (e.g., the filter 210, the panel 208, etc.) from the filtration system 116 and/or the filtration apparatus 100-800. In some examples, the panel 208 provides means for retaining the filter 210 in the housing 122, 802. In some examples, the housing 122, 802 provides means for defining a cavity or a housing and/or provide means for receiving the filter 210 and/or the panel 208. In some examples, the cleanout passageways 402, 602, 702 and/or the pipes 408, 608, provide means for channeling a cleaning fluid 412. In some examples, the cleanout inlet 404, 604 provide means for receiving the cleaning fluid 412. In some examples, the cleanout outlet 406, 606, 702 and/or the outlet valve 418, the nozzles 612, and/or the actuators 704 provide means for dispensing the cleaning fluid 412 toward the filter 210. In some examples, the bypass system 118 and/or the bypass valve 308 provides means for bypassing the filtration passageway 202 and/or the filter 210.

Figure 9:
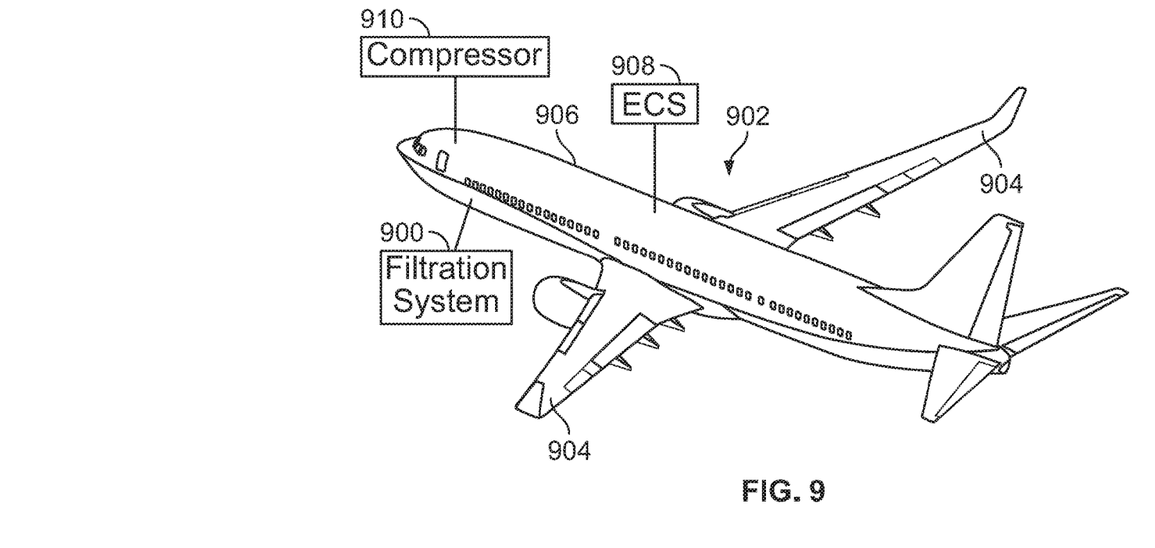
FIG. 9 is an example aircraft including an example filtration apparatus disclosed herein.

FIG. 9 illustrates an example aircraft 902 that includes an example filtration apparatus 900 disclosed herein. The aircraft 902 of FIG. 9 includes wings 904 (e.g., a right wing and a left wing) extending laterally outward from a fuselage 906. The filtration apparatus 900 disclosed herein can provide filtered airflow to one or more system(s) of the aircraft 902. For example, the filtration apparatus 900 disclosed herein can provide filtered airflow to, for example, an environmental control system 908, an air compressor 910, etc. In some examples, the filtration apparatus 900 of the illustrated example can be used to filter ram air and/or airflow to any other air intake system(s). In some examples, any one of the filtration apparatus 500-800 can be used to implement the filtration apparatus 900 of FIG. 9. In some examples, the aircraft 902 can be retrofit with a filtration apparatus disclosed herein.

The example teachings disclosed herein are not limited to the aircraft 902 of FIG. 9. For example, the filtration apparatus 100-800 disclosed herein can be implemented with other types of aircraft such as, for example, vertical takeoff and landing aircraft, military aircraft, helicopters, drones, and/or any other type of aircraft. In some such examples, the filtration apparatus 100-800 disclosed herein can be employed to filter particulate from engine intake air upstream of intake air entering a combustion chamber of an engine (e.g. a turbine, an internal combustion engine, etc.). In some examples, the filtration systems disclosed herein can be implemented with other types of vehicles including, but not limited to, a ship, a submarine, a ground vehicle (e.g., a race car, a train, an automobile, a bus, construction vehicles and/or equipment, etc.) and/or any other vehicle employing air filtration system(s). In some examples, the filtration system disclosed herein can be employed with air ventilation systems of buildings (e.g., heating, ventilation, and air conditioning (HVAC) systems), vehicles (e.g., cabin air), and/or any other ventilation system(s).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

From the foregoing, it will be appreciated that example methods, apparatus and articles of manufacture improve maintenance operations for any platform, vehicle or system that draws or receives an operating fluid (e.g., air) in harsh conditions. At least some of the aforementioned examples include one or more features and/or benefits including, but not limited to, the following:

Example 1 includes a filtration apparatus having a housing including a plurality of walls defining a cavity, a filter is located in the cavity, and a cleanout system coupled to the housing. In some examples, the cleanout system includes a cleanout passageway between an outer surface of the housing and the filter. In some examples, the cleanout system includes a cleanout inlet accessible from the outer surface of the housing and a cleanout outlet in fluid communication with the filter. In some examples, the cleanout system to enable removal of particulate from the filter without removing the filter from the housing.

Example 2 includes the filtration apparatus of Example 1, further including a panel coupled to the housing to enclose the filter within the cavity.

Example 3 includes the filtration apparatus of any one of Examples 1-2, where the filter has a first side oriented toward the outer surface of the housing and a second side oriented toward the cavity, the filter to capture particulate in fluid entering the cavity of the housing through the filter.

Example 4 includes the filtration apparatus of any one of Examples 1-3, where the cleanout inlet is accessible via an cleanout access port positioned adjacent the first side of the filter.

Example 5 includes the filtration apparatus of any one of Examples 1-4, where the cleanout system is to direct cleaning fluid from the cleanout inlet to the cleanout outlet, and the cleanout outlet is to direct the cleaning fluid from the second side of the filter toward the first side of the filter.

Example 6 includes the filtration apparatus of any one of Examples 1-5, where the cleanout outlet includes a guide to direct cleaning fluid from the cleanout outlet toward the filter.

Example 7 includes the filtration apparatus of any one of Examples 1-6, where the cleanout outlet includes a plurality of nozzles to direct cleaning fluid toward the filter.

Example 8 includes the filtration apparatus of any one of Examples 1-7, where the filtration apparatus includes a bypass passageway to enable fluid flow from an exterior of the housing to the cavity when a fluid flow through the filter is less than a fluid flow threshold.

Example 9 includes the filtration apparatus of any one of Examples 1-8, where the cleanout passageway is isolated relative to the bypass passageway and a filtration passageway when the cleanout passageway is in a non-cleanout mode.

Example 10 includes the filtration apparatus of any one of Examples 1-9, where at least a portion of the cleanout passageway is located in the cavity of the housing.

Example 11 includes the filtration apparatus of any one of Examples 1-10, further including a blocker plate to block fluid flow through a housing outlet when a cleaning fluid is provided through the cleanout passageway.

Example 12 includes the filtration apparatus of any one of Examples 1-11, further including a one-way valve positioned adjacent the cleanout outlet, the one-way valve movable between an open position to allow cleanout fluid to exit the cleanout outlet during a cleaning operation and a closed position to prevent fluid flow through the cleanout system during a filtration operation.

Example 13 includes a filtration apparatus including a filter system defining a primary passageway having a primary inlet and a primary outlet, the primary inlet to be in fluid communication with atmosphere and the primary outlet to be in fluid communication with a downstream component. A cleanout system defines a secondary passageway having a secondary inlet located adjacent the primary inlet and a secondary outlet located adjacent the primary outlet.

Example 14 includes the filtration apparatus of Example 13, further including a housing defining a cavity to receive a filter, the housing and the filter defining the primary passageway.

Example 15 includes the filtration apparatus of any one of Examples 13-14, where at least a portion of the secondary passageway passes through the cavity.

Example 16 includes the filtration apparatus of any one of Examples 13-15 where the housing supports the secondary inlet and the secondary outlet.

Example 17 includes the filtration apparatus of any one of Examples 13-16, further including a guide adjacent the secondary outlet to direct cleaning fluid toward the filter during a cleaning operation, wherein the cleaning fluid is to flow from the cavity to an exterior of the housing via the filter during the cleaning operation.

Example 18 includes a filtration apparatus having means for filtering atmospheric air for use by a downstream component; means for defining a cavity to receive the means for filtering; and means for cleaning the means for filtering without removing the means for filtering from the filtering apparatus.

Example 19 includes the filtration apparatus of Example 18, where the means for cleaning includes a means for channeling a cleaning fluid between a means for receiving the cleaning fluid and a means for dispensing the cleaning fluid toward the means for filtering.

Example 20 includes the filtration apparatus of any one of Examples 18-20, where the means for channeling the cleaning fluid is coupled to the means for filtering.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A filtration apparatus comprising:
    a housing including a plurality of walls defining a cavity and an opening to enable access to the cavity, the opening formed in a first wall of the housing;
    a filter located in the cavity and accessible via the opening, the filter having a first side oriented toward the opening and a second side opposite the first side oriented toward the cavity; and
    a cleanout system coupled to the housing, the cleanout system including a cleanout passageway between an outer surface of the housing and the filter, the cleanout system including a cleanout inlet and a cleanout outlet, the cleanout inlet accessible via a cleanout access port positioned at the first wall of the housing adjacent the opening, the cleanout outlet in fluid communication with the second side of the filter, the cleanout system to enable removal of particulate from the filter without removing the filter from the housing.

2. The filtration apparatus of claim 1, further including a panel coupled to the housing to enclose the filter within the cavity.

3. The filtration apparatus of claim 1, wherein the filter is to capture particulate in fluid entering the cavity of the housing through the filter.

4. The filtration apparatus of claim 3, wherein the cleanout system is to direct cleaning fluid from the cleanout inlet to the cleanout outlet, and the cleanout outlet is to direct the cleaning fluid from the second side of the filter toward the first side of the filter, the fluid and the particulate to exit the housing via the opening.

5. The filtration apparatus of claim 1, wherein the cleanout outlet includes a guide to direct cleaning fluid from the cleanout outlet toward the filter.

6. The filtration apparatus of claim 1, wherein the cleanout outlet includes a plurality of nozzles to direct cleaning fluid toward the filter.

7. The filtration apparatus of claim 1, wherein the filtration apparatus includes a bypass passageway to enable fluid flow from an exterior of the housing to the cavity when a fluid flow through the filter is less than a fluid flow threshold.

8. The filtration apparatus of claim 7, wherein the cleanout passageway is isolated relative to the bypass passageway and a filtration passageway when the cleanout passageway is in a non-cleanout mode.

9. The filtration apparatus of claim 1, wherein at least a portion of the cleanout passageway is located in the cavity of the housing.

10. The filtration apparatus of claim 1, further including a blocker plate to block fluid flow through a housing outlet when a cleaning fluid is provided through the cleanout passageway.

11. The filtration apparatus of claim 1, further including a one-way valve positioned adjacent the cleanout outlet, the one-way valve movable between an open position to allow cleanout fluid to exit the cleanout outlet during a cleaning operation and a closed position to prevent fluid flow through the cleanout system during a filtration operation.

12. The filtration apparatus of claim 2, wherein the panel includes slots to enable airflow from the atmosphere to flow to the first side of the filter, the cleanout access port and the panel accessible from the first wall of the housing.

13. The filtration apparatus of claim 1, wherein the cleanout access port and the first side of the filter are located on the same side of the housing.

14. The filtration apparatus of claim 1, wherein the cleaning fluid includes compressed water.

15. A filtration apparatus comprising:
    a housing defining a primary passageway having a primary inlet and a primary outlet, the primary inlet to be in fluid communication with atmosphere and the primary outlet to be in fluid communication with a downstream component, the primary inlet including an aperture formed in a face of the housing, the aperture to enable access to a cavity of the primary passageway from an exterior of the housing;
    a filter positioned in the cavity of the housing to filter airflow through the primary passageway, the filter including a filter inlet and a filter outlet opposite the filter inlet, the filter inlet oriented toward the primary inlet, the filter outlet oriented toward the cavity;
    a panel coupled to the face of the housing to enable access to the filter positioned in the cavity of the housing, the panel having an opening in fluid communication with the primary inlet of the housing, the opening to allow fluid flow to the filter inlet during a non-cleaning operation; and
    a cleanout system defining a secondary passageway having a secondary inlet and a secondary outlet, the secondary inlet positioned adjacent the panel and accessible via the face of the housing, the secondary outlet to allow cleaning fluid to flow from the filter outlet through the filter inlet during a cleaning operation, the cleaning fluid and particulate to exit the filter inlet via the opening of the panel during the cleaning operation.

16. The filtration apparatus of claim 15, wherein at least a portion of the secondary passageway passes through the cavity.

17. The filtration apparatus of claim 15, wherein the housing supports the secondary inlet and the secondary outlet.

18. The filtration apparatus of claim 15, further including a guide adjacent the secondary outlet to direct cleaning fluid toward the filter outlet during the cleaning operation.

19. The filtration apparatus of claim 15, wherein cleaning fluid is to flow from the cavity to an exterior of the housing via the filter during a cleaning operation.

20. A filtration apparatus comprising:
    means for filtering atmospheric air for use by a downstream component, the means for filtering including a filter inlet and a filter outlet;

means for defining a cavity to receive the means for filtering, the means for defining the cavity having a bottom wall that includes means for enabling access to the means for filtering when the means for filtering is positioned in the means for defining the cavity; and means for cleaning the means for filtering without removing the means for filtering from the filtration apparatus, the means for cleaning including a means for channeling a cleaning fluid between a means for receiving the cleaning fluid and a means for dispensing the cleaning fluid toward the means for filtering, the means for receiving the cleaning fluid coupled to the bottom wall and positioned adjacent the means for enabling access to the means for filtering.

21. The filtration apparatus of claim 20, wherein the means for channeling the cleaning fluid is coupled to the means for defining the cavity.

22. The filtration apparatus of claim 20, wherein the filter inlet and the means for receiving the cleaning fluid are oriented in the same direction.

\* \* \* \* \*